3,418,395
DYEABLE POLYOLEFIN COMPOSITION CONTAINING AN ESTER EXCHANGED ETHYLENE/UNSATURATED ACID ESTER COPOLYMER
Isoji Taniguchi, Osaka, Kenichi Maemoto, Ibaraki, Takeshi Shimamura, Niihama, Tomohide Yasumura, Shiga-gun, Shiga-ken, Yasuro Samejima, Nishinomiya, Kosaku Onodera and Teruo Oono, Shiga-gun, Shiga-ken, Japan, assignors to Sumitomo Chemical Co., Ltd., Higashi-ku, Osaka, and Toyo Boseki Kabushiki Kaisha, Kita-ku, Osaka, Japan
No Drawing. Filed Feb. 28, 1966, Ser. No. 530,400
Claims priority, application Japan, Mar. 5, 1965, 40/12,915; Oct. 13, 1965, 40/62,767
7 Claims. (Cl. 260—895)

ABSTRACT OF THE DISCLOSURE

Dyeable polyolefin compositions are prepared from a blend of a polyolefin and a copolymer of ethylene with an acrylic acid ester or maleic acid ester, characterized by treating said copolymer with an amino alcohol or with an alcohol having a nitrogen containing heterocyclic group before or after blending with the polyolefin.

---

The present invention relates to an improved polyolefin composition and, more particularly, to a polyolefin composition with improved affinity for dyes, and to a method for producing the same. More particularly, this invention relates to a method of producing a polyolefin composition by admixing polyolefin with a copolymer of ethylene and an acrylic acid ester compound or maleic acid ester compound, characterized by treating said copolymer with an amino alcohol or with an alcohol having a nitrogen-containing heterocyclic group before or after the admixture.

It is well known that polyolefins, e.g. crystalline polypropylene and polyethylene, are moldable into fibers, films, and other shaped articles having excellent physical and mechanical properties. These polyolefins, however, have their own intrinsic defects and, therefore, their uses in the production of general shaped articles are restricted within stringent limits. For example, since polyolefin itself is hydrophobic and chemically inert, application of the conventional dyeing methods to the polyolefin is difficult, and accordingly it has been difficult to dye polyolefin in deep shades having high fastness to sunlight laundering, rubbing and dry-cleaning. For this reason, much study has heretofore been made to improve the dye receptivity of polyolefin, and a number of methods have been proposed.

One notable method comprises adding certain materials, having affinity for dye, to polyolefin. However, such additives are generally so poorly miscible with polyolefin that the two materials tend to be separated into two distinct phases in solid solution. The additives only exist in the form of small grains as a dispersion, and the composition is not homogeneous enough. When the additives remains dispersed in the form of small grains in the polyolefin, the dyeing efficiency under practical conditions is considerably lowered than when it forms a solid solution. In melt-spinning, such a dispersion yields discontinual filaments when extruded through a spinnerette nozzle or suffers in drawability, resulting ultimately in more or less degradations in physical properties of the fiber. Moreover, as the fiber is subjected to frictional forces at the drawing and subseqeunt steps, the additive which has separated from the polyolefin phase becomes free from the latter, resulting in uneven dyeing.

In order to overcome these defects and to improve the dye receptivity of polyolefin we have studied a great number of substances which might be used as additives for the above-mentioned purposes. The study has resulted in the finding that a polyolefin composition, which satisfies the above-mentioned requirements and, accordingly, is excellent in dyeability and fastness and, yet, retains the desirable physical and mechanical properties of polyolefin, is obtained by incorporating into polyolefin a copolymer of ethylene and an acrylic acid ester compound or a maleic acid ester compound, said copolymer being treated with an aminoalcohol or an alcohol having a nitrogen-containing heterocyclic group, before or after its incorporation into the polyolefin.

The composition of the present invention is prepared either by admixing polyolefin with a modified copolymer obtainable by treating a copolymer of ethylene and a maleic acid ester compound or an acrylic acid ester compound having the following formula:

$$CHR^1 = CR^2 COOR^3 \qquad (I)$$

wherein $R^1$ is hydrogen atom or $-COOR^4$, $R^2$ is hydrogen atom or methyl radical, each of $R^3$, $R^4$ is an alkyl radical having from 1 to 5 carbon atoms, with an aminoalcohol having the following formula:

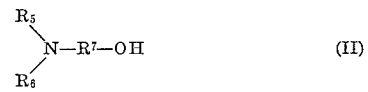

wherein each of $R^5$ and $R^6$ is hydrogen atom or a hydrocarbon radical such as alkyl, cycloalkyl, aralkyl or aryl radical, the hydrogen atoms of the above radical may be substituted with amino or alkylamino radicals, and $R^7$ is a divalent aliphatic, alicyclic or aromatic hydrocarbon radical, or with an alcohol having nitrogen-containing heterocyclic radical and having the formula:

$$X - R^8 - OH \qquad (III)$$

wherein $R^8$ is a divalent aliphatic hydrocarbon radical and X is a nitrogen-containing heterocyclic radical. The polyolefin composition of this invention may also be produced by admixing the ethylene ester copolymer described above with polyolefin and treating the resulting mixture with the alcohol described above. In either case, a useful polyolefin composition is obtained.

The polyolefins used in the present invention include homopolymers, copolymers and interpolymers of at least one of ethylene, propylene, butene-1, 4-methylpentene-1, 3-methylbutene-1, 3,3-dimethylbutene-1, and the like. A blended polymer composition wherein such polyolefin predominates may also be used. The isotactic polypropylene, which is produced by polymerizing propylene in the presence of the Ziegler-Natta catalyst, is preferable.

The ethylene-acrylic (or maleic) acid ester copolymer used in the present invention may be produced according to the conventional manner. Thus, for example, the co-polymerization reaction between ethylene and acrylic or maleic acid ester may be carried out under ethylene pressure of 1000–2000 kg./cm.$^2$ and at 120–250° C. in the presence of a catalyst such as oxygen, organic peroxides, azo or diazo compounds, and the like.

The acrylic or maleic acid ester compounds of the Formula I include methyl acrylate, ethyl acrylate, propyl acrylate, butyl acrylate, pentyl acrylate, methyl methacrylate, ethyl methacrylate, butyl methacrylate, methyl malate, ethyl malate, methyl fumarate and the like. It is to be understood, however, that the type of radicals $R^3$ and $R^4$ in the above described general formula is of no particular importance and, therefore, from economic viewpoints, such inexpensive compounds as methyl acrylate, ethyl acrylate, methyl methacrylate, methyl malate, ethyl malate, methyl fumarate are more advantageously utilized.

Among the copolymers, those containing 1 to 50 mole percent, preferably 1–30 mole percent, most preferably 2–20 mole percent of the acrylic (or maleic) acid ester units and having an intrinsic viscosity of 0.05–4 dl./g. as measured in xylene solution at 120° C. are particularly preferable.

When the copolymer contains only less than 1 mole percent of acrylic or maleic acid ester units, it does not substantially improve the dye affinity of polyolefin so long as the copolymer is added to polyolefin within the suitable quantity range that will hereinafter be defined, irrespective of whether the copolymer is first treated with the alcohol and, then, the resulting product is added to polyolefin or the copolymer is first admixed with polyolefin and, then, the mixture is treated with the alcohol. If excess amount of the copolymer, which contains only less than 1 mole percent of acrylic acid ester units, is added to polyolefin beyond the said suitable quantity range and mixed, the resulting composition will no longer have the satisfactory mechanical properties, although the dyeability of the composition may be improved.

The modified copolymer prepared by treating the copolymer containing more than 50 mole percent of the acrylic or maleic acid ester units with the alcohol is poorly miscible with polyolefin. When the copolymer containing more than 50 mole percent of the acrylic or maleic acid ester units is first admixed with polyolefin and the resulting mixture is treated with the alcohol, there is often encountered a phase separation during the alcohol-treatment step or at the molding step.

Since the melting point of the modified copolymer prepared by treating the copolymer with the alcohol is generally lower than that of polyolefin the copolymer may be used safely so long as its intrinsic viscosity range from 0.05 to 4.0 dl./g.

Examples of aminoalcohols of the Formula II which may be used in the treatment of ethylene-acrylic (or maleic) acid ester copolymers according to this invention are:

aminoethanol,
N-methylamino ethanol,
N,N-dimethylaminoethanol,
N-ethylaminoethanol,
N,N-diethylaminoethanol,
N,N-dibutylaminoethanol,
N-benzylaminoethanol,
N,N-dibenzylaminoethanol,
N-ethylanilinoethanol,
N-phenylaminoethanol,
N-(aminoethyl)aminoethanol,
N-cyclohexylaminoethanol,
aminopropanol,
N-methylaminopropanol,
N,N-dimethyl aminopropanol,
N-ethylaminopropanol,
N,N-diethylaminopropanol,
N,N-dibutylaminopropanol,
aminobutanol,
N,N-dimethylaminobutanol,
N,N-diethylaminobutanol,
N,N-dimethylaminohexanol,
aminophenylethanol, etc.

Examples of alcohols of the Formula III having nitrogen-containing heterocyclic group are:

1-pyrrolidine ethanol,
2-pyrrolidine-methanol,
1-pyrrolidinepropanol,
1-piperidine methanol,
4-piperidinemethanol,
1-piperidine ethanol,
2-piperidine ethanol,
1-piperidinepropanol,
3-morpholinemethanol,
4-morpholine ethanol,
2-morpholine ethanol,
4-morpholinepropanol,
4-morpholinepentanol,
1-piperadinemethanol,
1-piperadineethanol,
2-methyl-1-piperidineethanol,
2,6-dimethyl-4-morpholineethanol,
2-pyridinemethanol,
2-pyridineethanol,
4-pyridineethanol,
2-quinolineethanol,
2-indolemethanol,
1-imidazoleethanol, etc.

The treatment of the ethylene-acrylic (or maleic) acid ester copolymer with the alcohol before admixing with polyolefin is carried out by contacting the copolymer with said alcohol at a temperature within a range of from 100° C. to 350° C. in the presence or absence of a catalyst. When the temperature is lower than the above range the reaction velocity would be unduly slow, while if the temperature is higher than the said range there would occur an undesirable side-reaction. These tendencies are seen somewhat even within the above mentioned temperature and therefore it is preferable to conduct the treatment with the alcohol at a temperature within the range from 130° C. to 300° C. The treatment may be conducted under atmospheric or increased pressure depending upon the particular alcohol, solvent used and treating temperature. Although the reaction can be conducted in the absence of a catalyst, it is preferable to employ a catalyst in order to obtain a high degree of ester exchange. Suitable catalysts are metal salts of organic acids, metal oxides, organo metallic compounds, Friedel-Crafts catalysts. More particular examples of these catalysts are zinc acetate, lead acetate, cadmium acetate, mercuric acetate, manganese acetate, calcium acetate, nickel acetate, sodium acetate, ferric acetate, cobalt acetate, zinc formate, lead formate, cadmium formate, zinc propionate, zinc n-butyrate, zinc N-valerianate, zinc n-capronate, zinc laurate, zinc stearate, zinc sulfate, zinc chloride, aluminium chloride, tin chloride, titanium tetrachloride, boron fluoride, p-toluenesulfonic acid, zinc glycoxide, manganese glycoxide, sodium methoxide, sodium ethoxide, sodium phenoxide, aluminium isopropoxide, lead oxide, zinc oxide, cadmium oxide, etc.

The treatment of the copolymer with the alcohol may be carried out either in the absence of a solvent; that is to say, by contacting the molten copolymer directly with the alcohol, or in the presence of an organic solvent. The organic solvent is used primarily for the purpose of conducting the reaction smoothly and controlling the reaction temperature. The solvents are preferably those capable of dissolving the copolymer, such as benzene, toluene, xylene, Decalin, tetralin, cyclohexane, tetrahydrofuran, cyclohexanol, carbon tetrachloride, etc.

When the composition of the present invention is prepared by admixing the copolymer with polyolefin and then, treating the resulting mixture with the alcohol, before molding the alcohol-treatment may be carried out under the same conditions as described above. Furthermore, after molding into a shaped article such as film or fiber, the article may be treated with the alcohol under suitable condition, e.g. at a temperature above room temperature and below the melting point of the polyolefin. In this case the alcohol may be used alone or the treatment may be conducted in the presence of a medium such as benzene or water. The alcohol may be used in a gaseous form or in a liquid form.

The ester-exchange of the ester-type side chain of the copolymer, during the course of alcohol-treatment of either the copolymer or the mixture of the copolymer and polyolefin, may attain up to about 98% depending on the treatment condition. Generally speaking the higher the temperature at which said treatment is carried out, the higher the ester exchange degree. Modified copolymers which are useful in preparing the composition of this invention are those having an ester exchange degree of higher than 2%.

The amount of the modified copolymer or the copolymer to be added to the polyolefin for the subsequent alcohol-treatment varies depending on the composition of the copolymer, but the suitable amount ranges from about 0.1 to 30% (as modified copolymer) by weight based on the weight of polyolefin. If the amount of the modified copolymer is below 0.1% by weight based on the weight of polyolefin, the dye affinity of the resulting composition will not be as high as practically useful, while the use of more than 30% by weight of said modified copolymer would often result in the loss of some of the desirable properties of the polyolefin. While the particulraly preferred range of amount of the modified copolymer varies depending on the depth of colour desired, it ordinarily ranges from about 1% to about 15% by weight based on the weight of polyolefin for fiber production and from about 1% to 25% by weight based on the weight of the polyolefin for the production of films and other shaped articles.

The admixing of polyolefin with the modified copolymer or with the copolymer may be performed mechanically and readily, because the component materials of the composition are compatible. For example, these component materials may be admixed with each other at elevated temperature on the rollers of a Banbury mixer or other suitable mixing mechanism or, alternatively, the admixing may likewise be conducted by the multi-stage extrusion technique.

In this admixing or prior thereto, various polyolefin stabilizers, such as antioxidant (e.g. alkylphenol compounds), ultraviolet degradation inhibitor (e.g. benzophenone derivatives), heat-resisting stabilizer (e.g. the thioether compounds of carboxylic acid esters), anti-static agent and/or other additives (e g. the metal salts of higher fatty acids) may be added. If such additions are made, the benefit of stabilization of the polyolefin may be attained in addition to the above-mentioned advantages of the present invention.

The polyolefin composition obtained according to the present invention is homogeneous solid solution possessing a high affinity for dyes and substantially retaining the desired physical properties of polyolefin. It has an excellent affinity for acid dyes, chromium dyes, metallized dyes, and other anionic types of dyes, although acid dyes are particularly suitable for the dyeing of the present composition.

Examples of suitable acid dyes include Xylene Light Yellow 2GP (C.I. Acid Yellow 29), Xylene Fast Yellow P (C.I. Acid Yellow 61), Azo Lubinol 3GS (C.I. Acid Red 37), Xylene Fast Red P (C.I. Acid Red 118), Alizarine Light Blue 4GL (C.I. Acid Blue 23), Xylene Fast Blue P (C.I. Acid Blue 82), Xylene Fast Blue PR (C.I. Acid Blue 129), Xylene Fast Violet P3R (C.I. Acid Violet 47), Alizarine Light Violet RS (C.I. Acid Violet 43), Alizarine Light Green GS (C.I. Acid Green 25), Hat Fast Black FS (C.I. Acid Black), Xylene Brilliant Black BN (C.I. Acid Black) (the above names are all the trademarks of Sandoz), Carbolan Yellow 3GS (C.I. Acid Yellow 72), Carbolan Crimson 3B (C.I. Acid Red 139), Carbolan Green G (C.I. Acid Green 27) (the above names are all trademarks of I.C.I.), and the like.

Among metallic dyes and chromium dyes useful are, for example, Neolan Yellow BE (C.I. Acid Yellow 54), Neolan Orange GRE (C.I. Acid Orange 62), Neolan Red GRE (C.I. Acid Red 183), Neolan Pink BE (C.I. Acid Red 195), Neolan Blue 2G (C.I. Acid Blue 158), Neolan Violet 3R (C.I. Acid Violet 56), Neolan Green BL (C.I. Acid Green 12), Neolan Brown 2G, Neolan Black WA (C.I. Acid Black 52), Cibalan Yellow GRL (C.I. Acid Yellow 116), Cibalan Orange RL (C.I. Acid Orange 88), Cibalan Red 2GL (C.I. Acid Red 211), Cibalan Scarlet G (C.I. Acid Red 209), Cibalan Blue BL (C.I. Acid Blue 168), Cibalan Brown BL (C.I. Acid Brown 19), Cibilan Green GL (C.I. Acid Green 43), Cibilan Gray BL (C.I. Acid Black 60) (the above names are all the trademarks of Ciba Ltd.).

Examples of chromium dyes are Sunchromine Yellow GG (C.I. Mordant Yellow 1), Sunchromine Red B (C.I. Mordant Red 15), Sunchromine Blue MB (C.I. Mordant Blue 13), Sunchromine Black A (C.I. Mordant Black 1), Sunchromine Blue Black B (C.I. Mordant Black 3) (the above names are all trademarks of Sumitomo Chemical Co., Ltd.), and the like.

The dyeing results may be compared by inspecting the shaped articles with naked eyes, or more exactly the comparisons may be made by using optical equipment or by measuring the take-up of dye per unit weight of the shaped article involved. Particularly in the case of fiber, it is common practice to compare the relative amounts of the dye taken up by the samples.

The polyolefin composition of the present invention may be dyed up to 100 mg./g. within the serviceable range, although the range varies depending upon the type of dye used. In case the composition is designed for fiber-making, as high as 50 mg./g. of dyeing is possible. Furthermore, the dyed articles are highly fast to sunlight, laundering, dry cleaning and rubbing.

The homogeneity of the present composition, as well as the absence of phase separation, may be clearly detected when the dyed film, for instance, is visually inspected or examined under the microscope, or when a bundle of the dyed filaments is set, for example, with epoxy resin and cut and the cross-section thereof is microscopically examined. The homogeneity of the polyolefin composition of the present invention may also be ascertained from the fact that, mechanical properties of the shaped articles made of the composition is substantially equal to the articles made of the polyolefin, or from the fact that at the extrusion into the filaments, discontinual filaments or uneven filaments are not made.

Furthermore, the composition of the present invention is superior to polyolefin in other respects. Yet retaining fully the desirable qualities of the polyolefin, the present composition possesses an improved printability when the film or other large-faced article of the composition is printed with dye or ink. Moreover, while polyolefin is electrically insulating and is charged extensively when rubbed, the polyolefin composition of the present invention is far less extensively charged.

The present invention will be further illustrated in detail by the following examples, which are given by way of illustration and it is not intended to limit the invention. In these examples, the various JIS tests substantially correspond to the AATCC (American Association of Textile Chemists and Colorists) as follows:

| | JIS | AATCC (1956) |
|---|---|---|
| Fastness (sunlight) | L-1044 | STM 16A-56. |
| Fastness (laundering) | L-1045 MC-2 | STM 61-54 IIA. |
| Fastness (dry cleaning) | L-1006 | STM 25-52. |
| Fastness (rubbing) | L-1048 | STM 8-52. |

Furthermore the abbreviation "o.w.f." indicated in these examples is for "on weight of fabric."

EXAMPLE 1

An ethylene-methyl acrylate copolymer containing 15.9% by weight of methyl acrylate (5.8 mole percent comonomer) and having an intrinsic viscosity of 1.082 dl./g. (in xylene at 120° C.) was treated with N,N-dimethyl aminoethanol at 220° C. for 4 hours in the presence of zinc acetate (catalyst) to prepare a modified copolymer having intrinsic viscosity 0.978 (in xylene at 120° C.), melting point, 76–94° C., and N content 2.2% by weight. The infrared absorption spectrum of the modified copolymer revealed that 92.4% of ester groups have been converted to amides.

10% by weight (based on the weight of polypropylene powder) of the modified copolymer was added to polypropylene powder and mixed. The resulting mixture was extruded into filaments at 210° C. The filaments were stretched 4 times the initial length in hot water at 95° C. and heat-treated at 120° C. for 30 minutes to prepare a fiber. The resulting fiber had strength 4.1 g./d., and elongation 38%.

The fiber was dyed under the following conditions: acid dye (Xylene Fast Red P) 5% o.w.f., nonionic surfactant 2% o.w.f., sulfuric acid 5% o.w.f., liquid ratio 50:1, 100° C., 60 minutes. The dyed fiber was soaped with a 0.5 g./l. of Marseilles soap for 20 minutes at 60° C. The fiber could be dyed to a deep red shade, which was found to correspond to the JIS 5th grade in fastnesses to sunlight, laundering and rubbing, and the JIS 5th grade in fastness to dry cleaning with perchloroethylene. A microscopic examination of the cross-section of the dyed fiber revealed that the fiber was dyed evenly.

EXAMPLE 2

The same ethylene-methyl acrylate copolymer as in Example 1 was treated with N,N-diethylaminoethanol at 160° C. for 4 hours in the presence of lead acetate to obtain a modified copolymer having intrinsic viscosity 0.998 dl./g., melting point 78–94° C. and ester exchange degree of 82.7%.

10% by weight (based on the weight of polypropylene powder) of the modified copolymer was added to polypropylene powder and mixed. The mixture was extruded into filaments at 210° C. The filaments were stretched 4 times the initial length in hot water at 95° C., and heat-treated at 120° C. for 30 minutes to prepare a fiber. The resulting fiber had strength 4.5 g./d. and elongation 43%. There was only a negligible reduction in strength as compared with ordinary polypropylene fiber.

The fiber prepared as above was dyed under the following conditions: Acid dye (Xylene Fast Blue PR) 3% o.w.f., nonionic surfactant 2% o.w.f., formic acid 5% o.w.f., liquid ratio 50/1, 100° C., 60 minutes. The dyed fiber was then soaped in a 0.5 g./l. of Marseilles soap bath at 60° C. for 20 minutes, whereby a deep blue fiber was obtained. The fiber was found to correspond to the JIS 5th grade in fastnesses to sunlight and rubbing, JIS 4th grade in fastness to laundering, and fastness to dry cleaning with perchloroethylene was also JIS 5th grade. A microscopic examination of the cross-section of the dyed fiber revealed that it had been evenly dyed.

The same fiber was dyed under the following conditions:

1:1 type metallized dye
  Neolan Red GRE, percent o.w.f. _____ 3
  Nonionic surfactant, percent o.w.f. _____ 2
  Sulfuric acid, percent o.w.f. _____ 5
  Liquid ratio _____ 50:1
  Temperature, ° C. _____ 100
  Time, minutes _____ 60

The dyed fiber was soaped with 0.5 g./l. Marseilles soap bath at 60° C. for 20 minutes. The fiber was dyed to deep red shade. The dyed fiber was JIS 5th grade in fastness to sunlight, laundering and rubbing. Its fastness to dry cleaning with perchloroethylene was also JIS 5th grade.

EXAMPLE 3

The same ethylene-methyl acrylate copolymer as in Example 1 was treated with N,N-diethyl-aminoethanol for 4 hours at 150–180° C. in the presence of zinc stearate (catalyst) and Decalin (solvent) to obtain a modified copolymer having an intrinsic viscosity of 1.188 dl./g., melting point 79–90° C., N content 1.58% (by weight) and ester exchange degree 67.6%.

The resulting modified copolymer was added to polypropylene, melt-spun, stretched and heat-treated in the same manner as in Example 1 to obtain fibers of a strength 4.4 g./d. and elongation 44%.

The fiber was dyed in the same manner as in Example 2. The dyed fiber was JIS 5th grade in fastnesses to sunlight, rubbing, laundering and dry-cleaning with perchloroethylene.

EXAMPLE 4

An ethylene-methyl acrylate copolymer of Example 1 was treated with N,N-dibutylaminopropanol at 160° C. for 4 hours in the presence of zinc acetate to prepare a modified copolymer having intrinsic viscosity 1.041 dl./g., melting point 77–99° C., N content 1.46% by weight and ester exchange degree 67.2%.

10% by weight (based on the weight of polypropylene powder) of the modified copolymer was added to polypropylene powder and mixed. The resulting mixture was extruded into filaments at 210° C. The filaments were stretched 4 times the initial length in hot water at 95° C. and, then heat-treated at 120° C. for 30 minutes to prepare a fiber. The resulting fiber had strength 4.2 g./d. and elongation 46%.

The fiber was dyed under the following conditions: Sunchromine Black A 8% o.w.f., nonionic surfactant 2% o.w.f., sulfuric acid 2% o.w.f., liquid ratio: 50:1, 120° C., 60 minutes. The dyed fiber was washed with water and then subjected to chroming for 40 minutes at 100° C. with a bath (ratio 50:1) containing 4% (o.w.f.) potassium bichromate and 2% (o.w.f.) formic acid, whereby a deep-black fiber was obtained. The dyed fiber was found to correspond to the JIS 5th grade in fastnesses to sunlight, laundering, and dry cleaning with perchloroethylene. The fastness to rubbing was JIS 4th grade. A microscopic examination of the cross-section of this fiber revealed that it had been evenly dyed.

EXAMPLE 5

An ethylene-methylmethacrylate copolymer containing 20.0% by weight (6.5 mole percent) of methyl methacrylate and having an intrinsic viscosity of 1.175 dl./g. was treated with N,N-diethylaminoethanol at 160° C. in the presence of zinc acetate to obtain a modified copolymer having an intrinsic viscosity 1.108 dl./g., melting point 75–90° C., N content 1.90% by weight and ester exchange ratio 76.7%.

10% by weight (based on the weight of polypropylene powder) of the modified copolymer was added to polypropylene powder and mixed. The resulting mixture was extruded into filaments at 210° C. The filaments were stretched 4 times the initial length in hot water at 95° C. and then heat treated at 126° C. for 30 minutes. The resulting fiber had a strength of 4.0 g./d., elongation 32%.

The fiber was dyed under the following conditions: 1:2-metallized dye (Cibalan Orange RL) 3% o.w.f., nonionic surfactant 2% o.w.f., acetic acid 2% o.w.f., liquid ratio 50:1, 100° C., 60 minutes. The dyed fiber was then soaped in a 0.5 g./l. of Marseilles soap bath at 60° C. for 20 minutes, whereby orange fiber was obtained. The fiber was found to be JIS 5th grade in fastness to sunlight, laundering and dry-cleaning with perchloroethylene. A microscopic examination of the cross-section of the dyed fiber revealed that it had been dyed evenly.

EXAMPLE 6

An ethylene-methylacrylate copolymer containing 14.8% by weight (5.4 mole percent) of methyl acrylate and having an intrinsic viscosity of 1.00 dl./g. and melting point 94–99° C. was prepared. 10% by weight (based on the weight of polypropylene powder) of this copolymer was added to polypropylene powder and mixed. The mixture was extruded into filaments, stretched and heat treated (at 120° C.) in the same manner as Example 5. The resulting fiber had strength, 4.6 g./d. and elongation 36%. The fiber was treated at 100° C. for 2 hours in 30% (by weight) benzene solution of N,N-diethylaminoethanol (liquid ratio 1:50), and then washed with water and dried.

The fiber was dyed under the following conditions: Xylene Fast Yellow 3% o.w.f., nonionic surfactant 2% o.w.f., formic acid 3%, 100° C., 60 minutes, liquid ratio 50:1. The fiber was then soaped with a 0.5 g./l. of Marseilles soap bath at 60° C. for 20 minutes, whereby the fiber was dyed in deep yellow.

The dyed fiber was found to correspond to the JIS 5th grade in fastnesses to sunlight, rubbing and dry cleaning with perchloroethylene. The fastness to laundering was JIS 4th grade.

The same fiber was dyed under the following conditions: Neolan Blue 2G (1:1 metallized acid dye) 5% o.w.f., nonionic surfactant 2% o.w.f., sulfuric acid 5% o.w.f., liquid ratio 50:1, 100° C., 60 minutes. The dyed fiber was then soaped at 60° C for 20 minutes in a 0.5 g./l. Marseilles soap bath, whereby it was dyed deep blue.

The dyed fiber was found to correspond to the JIS 5th grade in fastness to sunlight, laundering, rubbing and dry cleaning with perchloroethylene.

EXAMPLE 7

The polypropylene fiber containing ethylene-methyl acrylate copolymer and prepared in the same manner as in Example 6 was treated in an autoclave with N,N-dimethylaminoethanol at 140° C. for 30 minutes.

The fiber was then dyed under the following conditions: Xylene Fast Violet P3R 3% o.w.f., nonionic surfactant 2% o.w.f., formic acid 3% o.w.f., liquid ratio 50:1, 100° C., 60 minutes. This procedure yielded reddish violet fiber.

The fiber was found to correspond to the JIS 4th grade in fastnesses to sunlight and laundering, while its fastness to rubbing and dry cleaning with perchloroethylene were JIS 5th grade.

EXAMPLE 8

An ethylene-methylacrylate copolymer containing 15.9% by weight (5.8 mole percent) of methylacrylate and having an intrinsic viscosity of 1.082 dl./g. (in xylene at 120° C.) was treated with 1-piperidine ethanol at 190° C. for 4 hours in the presence of lead oxide to obtain a modified copolymer having an intrinsic viscosity of 1.08 dl./g., melting point 82–92° C., N content 1.67% and ester exchange ratio 73.0%.

Ten parts by weight of the modified copolymer were mixed with 90 parts by weight of polypropylene powder, and the mixture was extruded into filaments at 210° C. The filaments were stretched 4 times the initial length in hot water at 95° C., and then heat treated at 120° C. for 30 minutes. The fiber thus obtained had a strength of 4.8 g./d. and elongation 35% which were comparable with those of the fiber of the same polypropylene alone.

The fiber was dyed under the following conditions: Xylene Fast Red P 2% o.w.f., nonionic surfactant 2% o.w.f., formic acid 3% o.w.f., liquid ratio 50:1, 100° C., 1 hour. The dyed fiber was then soaped in the same manner as in Example 5 to obtain a deep red fiber. The fastness of this fiber to sunlight was JIS 4th grade, and fastnesses to laundering, rubbing and dry cleaning were JIS 5th grade. A microscopic examination of the cross-section of this fiber revealed that the fiber had been dyed evenly.

The same fiber was dyed under the following conditions: Xylene Fast Blue PR 5% o.w.f., nonionic surfactant 2% o.w.f., formic acid 5%, dichlorobenzene 3 g./l., liquid ratio 50:1, 100° C., 1 hour. The dyed fiber was then soaped, to otbain a deep blue fiber. The dyed fiber was found to correspond to the JIS 5th grade in fastnesses to sunlight, and JIS 4th grade in fastnesses to laundering and rubbing, and the JIS 5th grade in fastness to dry cleaning. A microscopic examination of the cross-section of the fiber revealed that the fiber had been dyed evenly.

EXAMPLE 9

An ethylene-methyl acrylate copolymer of Example 8 was treated with morphorinethanol at 180° C. for 4 hours in the presence of lead oxide to prepare a modified copolymer having intrinsic viscosity 1.15 dl./g., melting point 75–89° C., N content 2.02% by weight, and ester exchange ratio 91.1%.

10 parts by weight of this modified copolymer was added to 90 parts by weight of polypropylene and mixed. The mixture was extruded into filaments in the same manner as in Example 8. The resulting fiber had strength, 1.1 g./d. and elongation 40.5%.

The fiber was dyed under the following conditions: Sunchromine Black A 8% o.w.f., nonionic surfactant 2% o.w.f., sulfuric acid 5% o.w.f., and dichlorobenzene 3 g./l. liquid ratio 50:1, 100° C., 1 hour. After washing, the fiber was subjected to chroming at 100° C. for 40 minutes in a bath (ratio 50:1) containing 4% (o.w.f.) potassium bichromate and 2% (o.w.f.) formic acid. The fiber was dyed in black. The dyed fiber was found to correspond to the JIS 5th grade in fastnesses to sunlight, laundering, rubbing, and dry cleaning. A microscopic examination of the cross-section of the dyed fiber revealed that it had been dyed evenly to the core.

The same fiber was dyed in the following conditions: Cibalan Orange RL 3% o.w.f., nonionic surfactant 2% o.w.f and acetic acid 2% o.w.f., liquid ratio 50:1, 100° C., 1 hour. After soaping there was obtained orange fiber. This fiber was JIS 4th grade in fastness to sunlight, JIS 5th grade in fastnesses to laundering, rubbing and dry cleaning. A microscopic examination of the cross-section of the dyed fiber revealed that the fiber had been dyed evenly.

EXAMPLE 10

An ethylene-methylacrylate copolymer of Example 8 was treated with 1-pyrrolidine ethanol at 180° C. for 4 hours in the presence of zinc acetate to obtain a modified copolymer having intrinsic viscosity 1.35 dl./g., melting point 90–100° C., N content 1.82% by weight, and ester exchange ratio 78.8%.

Ten parts by weight of the modified copolymer was added to 90 parts by weight of polypropylene powder and mixed. The resulting mixture was extruded into filaments in the same manner as in Example 8. The resulting fiber had strength, 4.0 g./d. and elongation, 32%.

The fiber was dyed under the following conditions: Neolan Blue 2G 3% o.w.f., nonionic surfactant 2% o.w.f., sulfuric acid 3% o.w.f., liquid ratio 50/l., 100° C., 1 hour. The fiber was then soaped with a 0.5 g./l. Marseilles soap bath at 60° C. for 20 minutes. The above procedure yielded a deep blue fiber. The dyed fiber was found to correspond to the JIS 5th grade in fastnesses to sunlight, laundering, rubbing and dry cleaning. A microscopic examination of the cross-section of the dyed fiber revealed that it had been dyed evenly to the core.

EXAMPLE 11

A copolymer of ethylene-methylacrylate of Example 8 was treated with 2-pyridinemethanol at 180–200° C. for 4 hours in the presence of zinc acetate to obtain a modified copolymer having an intrinsic viscosity of 1.05 dl./g., melting point 83–95° C., N content 1.77% by weight and ester exchange ratio 7.58%.

Then parts by weight of this modified copolymer were added to and well mixed with 90 parts by weight of polypropylene powder, and the mixture was extruded into filaments in the same manner as in Example 8, to obtain fiber having a strength 4.3 g./d. and elongation 26%.

The fiber was dyed under the following conditions: Alizarine Light Green GS 3% o.w.f., nonionic surfactant 2% o.w.f., sulfuric acid 3% o.w.f., liquid ratio 50:1, 100° C., 1 hour. Then the fiber was soaped and there was obtained black fiber. The dyed fiber was JIS 5th grade in fastnesses to sunlight and dry cleaning and JIS 4th grade in fastnesses to laundering and rubbing. A microscopic examination of the dyed fiber revealed that the fiber had been dyed evenly.

The same fiber was dyed under the following conditions: Xylene Brilliant Black BN 8% o.w.f., nonionic surfactant 2% o.w.f., sulfuric acid 5% o.w.f., liquid ratio 50:1, 100° C., 1 hour. Then the fiber was soaped and there was obtained black fiber. The dyed fiber was JIS 5th grade in fastnesses to sunlight and dry cleaning, and JIS 4th grade in fastnesses to laundering and rubbing. A microscopic examination of the dyed fiber revealed that the fiber had been dyed evenly.

What we claim is:

1. A process for producing an improved polyolefin composition which comprises incorporating 0.1 to 30 percent, by weight based on polyolefin, of a copolymer which consists of 99 to 50 mole percent of ethylene and 1 to 50 mole percent of a maleic acid ester compound or an acrylic acid ester compound of the formula:

$$CHR'=CHR^2COOR^3$$

wherein R' is a member selected from the group consisting of hydrogen atom and —$COOR^4$; $R^2$ is a member selected from the group consisting of a hydrogen atom and a methyl radical; each of $R^3$ and $R^4$ is an alkyl radical having from 1 to 5 carbon atoms, reacting said copolymer, before or after said incorporation into the polyolefin, with a member selected from the group consisting of amino-alcohols of the formula:

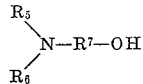

wherein each of $R^5$ and $R^6$ is a member selected from the group consisting of hydrogen atom and alkyl, cycloalkyl, aralkyl and aryl radicals, the hydrogen atom(s) of which may be substituted with a member selected from the group consisting of amine and alkyl-substituted amino radicals, $R^7$ is a member selected from the group consisting of polymethylene and alkylene radicals having up to 6 carbon atoms and divalent aromatic hydrocarbon radicals having up to 8 carbon atoms and alcohols containing a nitrogen-containing heterocyclic radical and having the general formula:

$$X—R^8—OH$$

wherein $R^8$ is a polymethylene or alkylene radical containing up to 5 carbon atoms and X is a member selected from the group consisting of pyrrolidinyl, piperidyl, morpholinyl, piperadinyl, pyridyl, quinolyl, indolyl and imidazolyl radicals, and their alkyl-substituted groups, to the extent that the copolymer contains about 2 to 98 mole percent of ester exchanged acrylic or maleic acid ester units.

2. A process according to claim 1, wherein the polyolefin is polypropylene.

3. A process according to claim 1, wherein the acrylic or maleic acid ester is methyl acrylate, ethyl acrylate or methyl methacrylate.

4. A process according to claim 1, wherein the alcohol is N,N-dimethylaminoethanol, N,N-diethylaminoethanol, N,N, - dibutylaminopropanol, 1 - piperidineethanol, morpholine ethanol, 1-pyrrolidine ethanol or 2-pyridine methanol.

5. A composition prepared by the process according to claim 1.

6. An article shaped from the composition prepared by the process according to claim 1.

7. A polypropylene fiber having an excellent affinity for dyes formed from a composition prepared by the process according to claim 1.

References Cited

UNITED STATES PATENTS

| | | | |
|---|---|---|---|
| 3,156,743 | 11/1964 | Coover et al. | 260—895 |
| 3,226,455 | 12/1965 | Matsubayashi et al. | 260—897 |
| 3,314,743 | 4/1967 | Gagliardi | 8—31 |
| 3,355,518 | 11/1967 | Sullivan et al. | 260—895 |

SAMUEL H. BLECH, *Primary Examiner.*

M. J. TULLY, *Assistant Examiner.*

U.S. Cl. X.R.

260—86.7, 986, 897, 78.5; 8—55